United States Patent
Jiang et al.

(10) Patent No.: US 11,375,051 B2
(45) Date of Patent: Jun. 28, 2022

(54) METHOD AND DEVICE FOR ENCAPSULATING AND DE-ENCAPSULATING GENERAL DATA STREAM

(71) Applicant: BEIJING KAIGUANG INFOTECH CO., LTD., Beijing (CN)

(72) Inventors: Hongqi Jiang, Beijing (CN); Zhentao Xin, Beijing (CN); Suhui Shen, Beijing (CN)

(73) Assignee: BEIJING KAIGUANG INFOTECH CO., LTD., Beijing (CN)

( * ) Notice: Subject to any disclaimer, the term of this patent is extended or adjusted under 35 U.S.C. 154(b) by 0 days.

(21) Appl. No.: 17/113,179

(22) Filed: Dec. 7, 2020

(65) Prior Publication Data
US 2021/0092207 A1    Mar. 25, 2021

Related U.S. Application Data

(63) Continuation of application No. PCT/CN2019/078368, filed on Mar. 15, 2019.

(30) Foreign Application Priority Data

Jun. 8, 2018   (CN) .......................... 201810590162.3

(51) Int. Cl.
*H04L 69/22*    (2022.01)
*H04L 65/60*    (2022.01)
(Continued)

(52) U.S. Cl.
CPC ............ *H04L 69/22* (2013.01); *H04L 65/607* (2013.01); *H04L 69/03* (2013.01); *H04L 69/06* (2013.01)

(58) Field of Classification Search
None
See application file for complete search history.

(56) References Cited

U.S. PATENT DOCUMENTS

| | | | | |
|---|---|---|---|---|
| 6,934,288 | B2 * | 8/2005 | Dempo | H04L 47/10 370/474 |
| 8,130,797 | B2 * | 3/2012 | Jung | H04N 21/23608 370/516 |

(Continued)

FOREIGN PATENT DOCUMENTS

| CN | 1543162 | 11/2004 |
|---|---|---|
| CN | 101022405 | 8/2007 |

(Continued)

OTHER PUBLICATIONS

WIPO, ISR for PCT/CN2019/078368, May 10, 2019.

(Continued)

*Primary Examiner* — Younes Naji
(74) *Attorney, Agent, or Firm* — Hodgson Russ LLP

(57) ABSTRACT

According to a method for encapsulating or decapsulating a general data stream, one or more data sections are obtained by encapsulating data of a transport object based on a format of the general data stream. The data section includes a data section head and a data section payload. The data section head includes a basic section head and an extension section head or includes the basic section head only. The basic section head includes a transport object identity, a data section length, a data section payload encapsulation mode and an extension section head flag. The encapsulation mode uses a variable-length packet encapsulation mode, a fixed-length packet encapsulation mode or a stream encapsulation mode. The flag indicates whether there is the extension section head and the extension section head includes at least (Continued)

one extended parameter. The one or more data sections are concatenated to obtain and transmit the general data stream.

20 Claims, 7 Drawing Sheets

(51) Int. Cl.
*H04L 69/00* (2022.01)
*H04L 69/06* (2022.01)

(56) References Cited

U.S. PATENT DOCUMENTS

| | | | | |
|---|---|---|---|---|
| 9,503,842 B2* | 11/2016 | Zhu | ............... | H04W 4/80 |
| 10,645,432 B2* | 5/2020 | So | ............... | H04N 21/4622 |
| 2004/0017823 A1* | 1/2004 | Kim | ............... | H04W 4/18 |
| | | | | 370/252 |
| 2006/0291426 A1* | 12/2006 | Park | ............... | H04W 8/26 |
| | | | | 370/349 |
| 2013/0136128 A1* | 5/2013 | Robinson | ............... | H04L 12/4633 |
| | | | | 370/392 |
| 2016/0134908 A1* | 5/2016 | Kwon | ............... | H04N 21/85406 |
| | | | | 725/109 |
| 2018/0234525 A1* | 8/2018 | Deshpande | ............... | H04L 69/22 |
| 2019/0230667 A1* | 7/2019 | Loehr | ............... | H04W 72/0466 |

FOREIGN PATENT DOCUMENTS

| | | | | |
|---|---|---|---|---|
| CN | 108989286 | | 12/2018 | |
| WO | WO-2014183281 A1 * | | 11/2014 | ......... H04L 12/4633 |

OTHER PUBLICATIONS

SIPO, First Office Action for CN Application No. 201810590162.3, dated Jul. 2, 2019.

Gandhi, "Implementation of Generic Stream Encapsulation Protocol for IP Datagram Encapsulation over DVB-S2 Baseband Frames," International Journal of Computer Applications (0975-8887), May 2016, vol. 142, No. 13, 4 pages.

* cited by examiner

METHOD AND DEVICE FOR ENCAPSULATING AND DE-ENCAPSULATING GENERAL DATA STREAM

CROSS-REFERENCE TO RELATED APPLICATION(S)

The present application is a continuation application of an International Application No. PCT/CN2019/078368, filed on Mar. 15, 2019, which claims priorities and benefits to Chinese Patent Application No. 201810590162.3, filed Jun. 8, 2018, the disclosures of both of which are incorporated herein by reference in their entireties.

FIELD

The present disclosure relates to the field of digital information transmission technology, and more particularly, to a method and a device for encapsulating and de-encapsulating a general data stream.

BACKGROUND

In current digital information transmission systems, and more particularly in a digital broadcast system, data of different services often need to be multiplexed and transmitted in many transmitting channels, such as cable channel, wireless channel, satellite channel and etc. Therefore, an encapsulation method is needed to enable transmitting multiple services in different transmission channels. Generally, a standard data stream format is defined, then an encapsulation method is employed to encapsulate different service data to the standard data stream and a further encapsulation method is employed to encapsulate the standard data stream to different transmitting channels.

Currently, the standard data stream format may include MPEG-2 Transport Stream (TS) and DVB-GSE (General Stream Encapsulation). MPEG-2 TS uses fixed-length TS packets. When variable-length packets are encapsulated into TS packets, processing overhead and transmission overhead are large. DVB-GSE uses variable-length GSE packets which can be directly applied to IP packets but it's not suitable for encapsulating stream-type data and also not efficient for encapsulating fixed-length packets. Therefore, it's difficult to multiplex and transmit variable-length packets, fixed-length packets and stream services in one data stream in high efficiency.

SUMMARY

In view of this, the present disclosure provides a method and a device for encapsulating and decapsulating a general data stream for the high efficient transmission of variable-length packets, fixed-length packets and stream services.

According to a first aspect of the embodiments of the present disclosure, a method for encapsulating a general data stream is provided. The method includes: obtaining one or more data sections by encapsulating data of a transport object based on a format of the general data stream, wherein each of the one or more data sections includes a data section head and a data section payload, the data section head includes a basic section head and an extension section head or includes the basic section head only, the basic section head includes a transport object identity, a data section length, a data section payload encapsulation mode and an extension section head flag. The data section payload encapsulation mode uses a variable-length packet encapsulation mode, a fixed-length packet encapsulation mode or a stream encapsulation mode, the extension section head flag indicates whether there is the extension section head and the extension section head includes at least one extended parameter; and concatenating the one or more data sections to obtain and transmit the general data stream.

According to a second aspect of the embodiments of the present disclosure, a method for decapsulating a general data stream is provided. The method includes: receiving the general data stream, wherein the general data stream is obtained by concatenating the one or more data sections, each of the one or more data sections includes a data section head and a data section payload, the data section head includes a basic section head and an extension section head or includes the basic section head only, the basic section head includes a transport object identity (TOI), a data section length, a data section payload encapsulation mode and an extension section head flag. The data section payload encapsulation mode uses a variable-length packet encapsulation mode, a fixed-length packet encapsulation mode or a stream encapsulation mode, the extension section head flag indicates whether there is the extension section head and the extension section head includes at least one extended parameter; determining whether the one or more data sections are to be decapsulated according to the transport object identity; in case the one or more data sections are to be decapsulated, determining whether there is the extension section head according to the extension section head flag; in case there is the extension section head, decapsulating the extension section head to obtain the extended parameter; obtaining the data section payload in the one or more data sections to be decapsulated; and decapsulating the payload in the one or more data sections according to the extended parameter and the data section payload encapsulation mode to obtain data of the transport object.

According to a third aspect of the embodiments of the present disclosure, a device for encapsulating or decapsulating a general data stream is provided. The device includes: a processor, and a memory configured to store instructions executable by the processor, wherein, the processor is configured to: obtain one or more data sections by encapsulating data of a transport object based on a format of the general data stream, wherein each of the one or more data sections includes a data section head and a data section payload, the data section head includes a basic section head and an extension section head or includes the basic section head only, the basic section head includes a transport object identity, a data section length, a data section payload encapsulation mode and an extension section head flag. The data section payload encapsulation mode uses a variable-length packet encapsulation mode, a fixed-length packet encapsulation mode or a stream encapsulation mode, the extension section head flag indicates whether there is the extension section head and the extension section head includes at least one extended parameter; and concatenate one or more data sections to obtain and transmit the general data stream; or the processor is configured to: receive the general data stream, wherein the general data stream is obtained by concatenating the one or more data sections, each of the one or more data sections includes a data section head and a data section payload, the data section head includes a basic section head and an extension section head or includes the basic section head only, the basic section head includes a transport object identity, a data section length, a data section payload encapsulation mode and an extension section head flag. The data section payload encapsulation mode uses a variable-length packet encapsulation mode, a fixed-length packet encapsulation mode or a stream encapsulation mode, the extension section head flag indicates whether there is the extension section head and the extension section head includes at least one extended parameter; determine whether the one or more data sections are to be decapsulated according to the transport object identity; in case the one or more data sections are to be decapsulated, determine whether there is the extension section head according to the extension section head flag; in case there is the extension section head, decapsulate the extension section head to obtain the extended parameter; obtain the data section payload in the one or more data sections to be decapsulated; decapsulate the payload in the one or more data sections according to the extended parameter and the data section payload encapsulation mode to obtain data of the transport object.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Figures 1, 2:
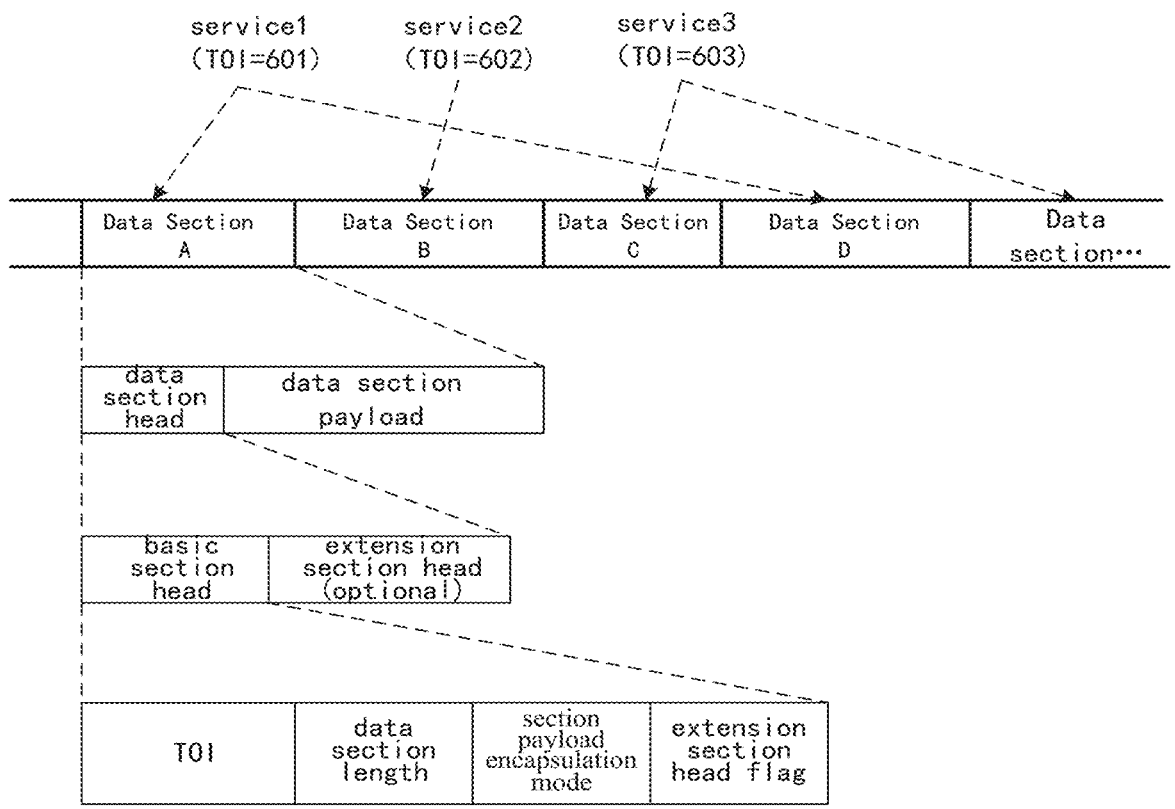
FIG. 1 is a flow chart showing a method for encapsulating a general data stream according to an embodiment of the present disclosure.
FIG. 2 is a chart showing a structure of the general data stream according to an embodiment of the present disclosure.

FIG. 1 is a flow chart showing a method for encapsulating a general data stream according to an embodiment of the present disclosure. As shown in FIG. 1, the method for encapsulating the general data stream includes the following steps.

In step 101, one or more data sections are obtained by encapsulating data of a transport object based on a format of the general data stream. Each of the one or more data sections includes a data section head and a data section payload, the data section head includes a basic section head and an extension section head or includes the basic section head only, the basic section head includes a transport object identity, a data section length, a data section payload encapsulation mode and an extension section head flag. The data section payload encapsulation mode uses a variable-length packet encapsulation mode, a fixed-length packet encapsulation mode or a stream encapsulation mode, the extension section head flag indicates whether there is the extension section head and the extension section head includes at least one extended parameter.

In step 102, the one or more data sections are concatenated to obtain and transmit the general data stream.

In an embodiment of the present disclosure, the one or more data sections may be obtained by encapsulating data from one transport object or from different transport objects.

A device for encapsulating the general data stream performs the method according to the embodiments of the present disclosure. The device could be hardware such as a UE or a server or could be software installed on the hardware. In an embodiment of the present disclosure, structure of the general data stream could be as shown in FIG. 2.

Transport Object Identity (TOI) indicates the transport object transmitting the data in the data section payload. The transport object may be services and the transport object identity may be a service identity. The services may include IP services, Ethernet services, ATM (Asynchronous Transfer Mode) services, PCM (Pulse Code Modulation) services, TS (Transport Stream) services, GSE (General Stream Encapsulation) services etc. Among these services, IP services and Ethernet services belong to the variable-length packet service, ATM services belong to the fixed-length packet service. PCM services belong to the unstructured stream service and TS services and GSE services belong to the structured stream service.

In FIG. 2, the TOI in section A and section D is 601, which means the data encapsulated in the data section payload of the two data sections is the service data for service 1 (TOI=601). In the embodiment, the TOI may be allocated by the device or may be produced according to service identity mapping. For example, TS service usually uses 13-bit PID identity. If the TOI uses 24 bits, an 11-bit fixed prefix may be added before the PID to get the TOI.

In the embodiment, the data section length indicates data amount contained in the data section. When it indicates the data section byte number, the maximum length of the data section is limited by the bit length. For example, in case of 16-bit length, the maximum data section length is 65535 bytes.

In the embodiment, the data section payload encapsulation mode indicates how to encapsulate the data of the transport object into the data section payload. The data section payload encapsulation mode uses a variable-length packet encapsulation mode, a fixed-length packet encapsulation mode or a stream encapsulation mode.

In the embodiment, the extension section head flag indicates whether there is the extension section head. In some encapsulation modes, there is no extension section head but in other encapsulation modes some new parameters need to be adopted. These parameters may be transmitted in the extension section head and these parameters are extended parameters. The extension section parameter includes one or more extended parameters.

Figure 3:
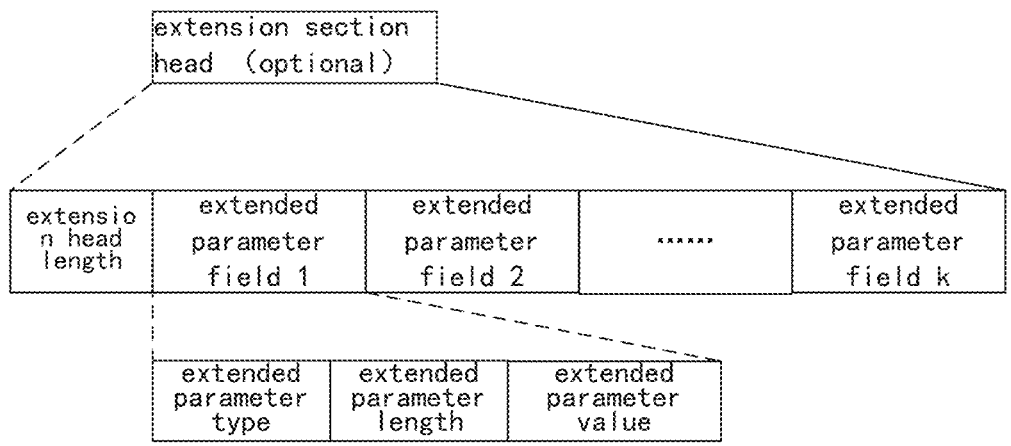
FIG. 3 is a chart showing a structure of an extension section head according to an embodiment of the present disclosure.

In the embodiment, the structure of the extension section head may be as shown in FIG. 3. In FIG. 3, the extension section head is obtained by concatenating the extension section head length and at least one extended parameter field. Each extended parameter field encapsulates one extended parameter, including an extended parameter type, an extended parameter length and an extended parameter value. The extension section head length indicates data amount contained in the extension section head, the extended parameter type indicates name of the extended parameter for identifying different extended parameters, the extended parameter length indicates data amount contained in the extended parameter field and the extended parameter value indicates content of the extended parameter.

Figure 4:
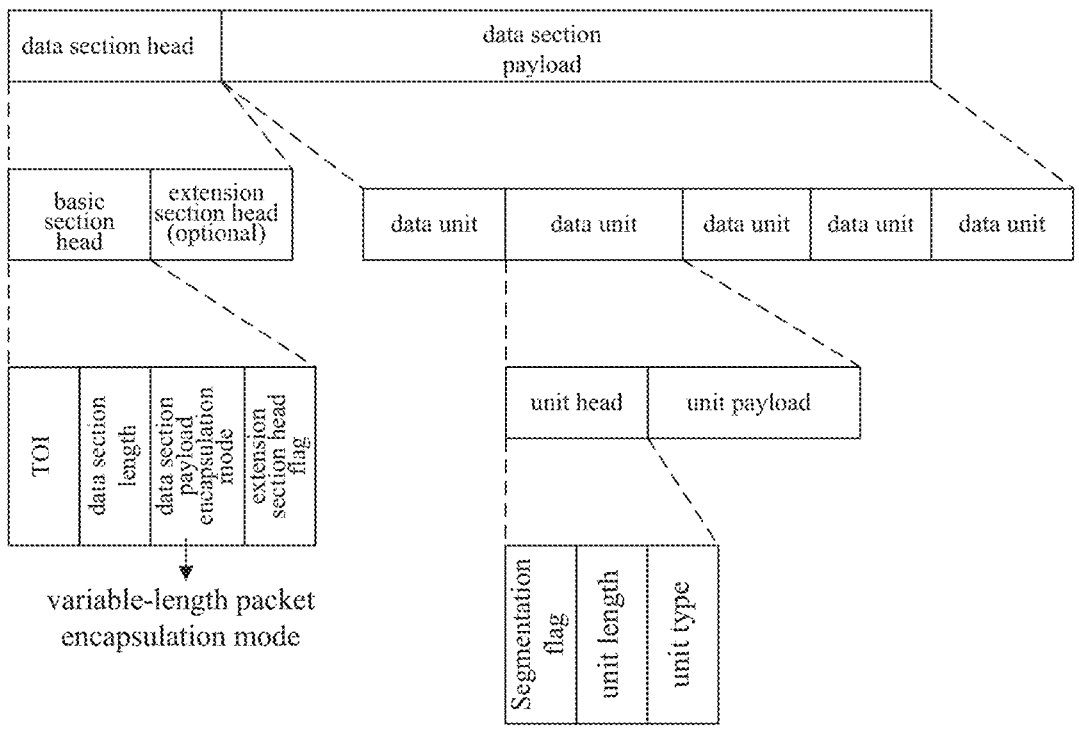
FIG. 4 is a chart showing a structure of a data section for IP services according to an embodiment of the present disclosure.

In an embodiment, IP service is taken as an example. IP service is the variable-length packet service and data of the transport object is IP packets. In case of the variable-length packet service, the data section payload encapsulation mode is the variable-length packet encapsulation mode. The data section payload includes at least one data unit and the at least one data unit includes a unit head and a unit payload, and the unit head includes a segmentation flag, a unit length and a unit type. FIG. 4 is a chart showing a structure of a data section for IP services according to an embodiment of the present disclosure.

In the embodiment, the segmentation flag may be a 2-bit field for indicating the segment status when the data packet of the transport object is encapsulated into the data unit. The segmentation flag may indicate four cases: the unit payload is a complete data packet, the unit payload is one segment of the data packet and is a starting segment, the unit payload is one segment of the data packet and is a middle segment, the unit payload is one segment of the data packet and is an ending segment.

In an embodiment, the unit length indicates data amount contained in the data unit. The unit length may be a 11-bit field to meet requirements of IP packet encapsulation. The unit type indicates the type of the data encapsulated in the unit payload. The unit type may be object data unit or padding unit. In case the unit type is the object data unit, the unit payload includes one complete data packet or partial data packet from the transport object. In case the unit type is the padding unit, the unit payload includes padding data consisted of random data or predetermined data.

In an embodiment, IP services are used. When the IP packets are encapsulated into the data unit, some IP packet is encapsulated as a whole into the unit payload of one data unit and the segmentation flag in the unit head indicates a complete IP packet; some IP packet is segmented into several segments and encapsulated into several continuous data units respectively and the segmentation flag indicates the starting segment, the middle segment or the ending segment of the IP packet. These data units may be transmitted in one data section sequentially or be transmitted in several consecutive data sections with the same TOI in the general data stream. However, data units of the same IP packet need to be encapsulated into the data section payload of these data sections sequentially and data unit for other IP packets should not be inserted. By concatenating data sections with the same TOI, the complete IP packet may be recovered according to the segmentation flag.

With the above variable-length encapsulation mode, only two bytes are needed in the unit head of each data unit to encapsulate one IP packet and one data section may encapsulate several IP packets simultaneously. Therefore, overhead of the data section head may be reduced a lot and higher efficiency than MPEG2-TS or DVB-GSE may be realized for the variable-length packet encapsulation.

In an embodiment, AMT services are used. ATM service is the fixed-length packet service and the data of the transport object is the ATM packets or ATM cells). In case of the fixed-length packet service, the data section payload encapsulation mode is the fixed-length packet encapsulation mode. The data section payload includes concatenated ATM packets. The extension section head identity indicates there is the extension section head. The extension section head includes a packet length and a packet starting position.

Figure 5:
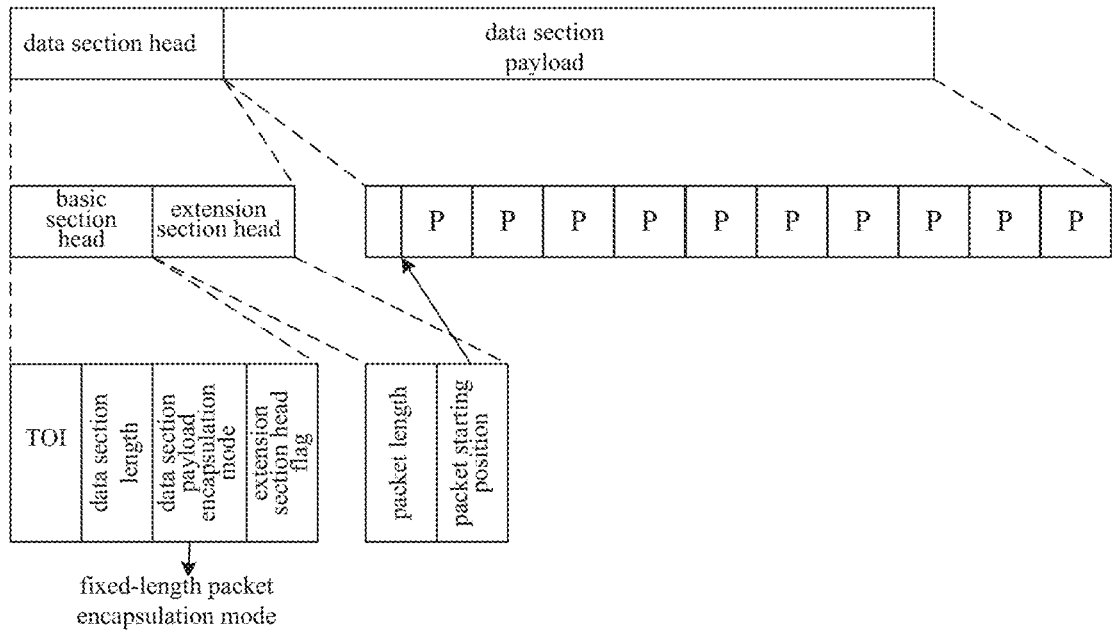
FIG. 5 is a chart showing a structure of a data section for ATM services according to an embodiment of the present disclosure.

FIG. 5 is a chart showing a structure of a data section for ATM services according to an embodiment of the present disclosure. In FIG. 5, P represents a fixed-length packet, for example an ATM packet (or ATM cell). In the embodiment, the length of the packet indicates data amount of a fixed-length packet. The starting position indicates the position where a fixed-length packet starts in the data section payload.

Taking ATM services as an example, in case the length of the packet is 53, the length of each ATM packet in the data section payload is 53 bytes. When the ATM data of the ATM service is encapsulated into the data section payload, since the data section length may not be an integral multiple of 53 bytes, it's possible that one ATM packet may be encapsulated into the end of a previous data section and into the beginning of a later data section, where the previous data section and the later data section correspond to a same TOI. Therefore, in the extension section head of the data section, the packet starting position indicates the position where the ATM packet, for example the first ATM packet, starts in the data section payload. In this way, the payloads of the neighboring two data sections are concatenated and the complete ATM packet will be recovered. In addition, even if the previous data section is lost, as long as there is the packet starting position, the position where the ATM packet starts in the data section payload may be determined and the subsequent ATM packet may be obtained further according to the packet length. In the fixed-length encapsulation mode, several fixed-length packets are encapsulated in one data section and the efficiency for encapsulating fixed-length packets is highly improved and overhead for adding one GSE packet head for each packet according to DVB-GSE protocol may be avoided.

Figure 6:
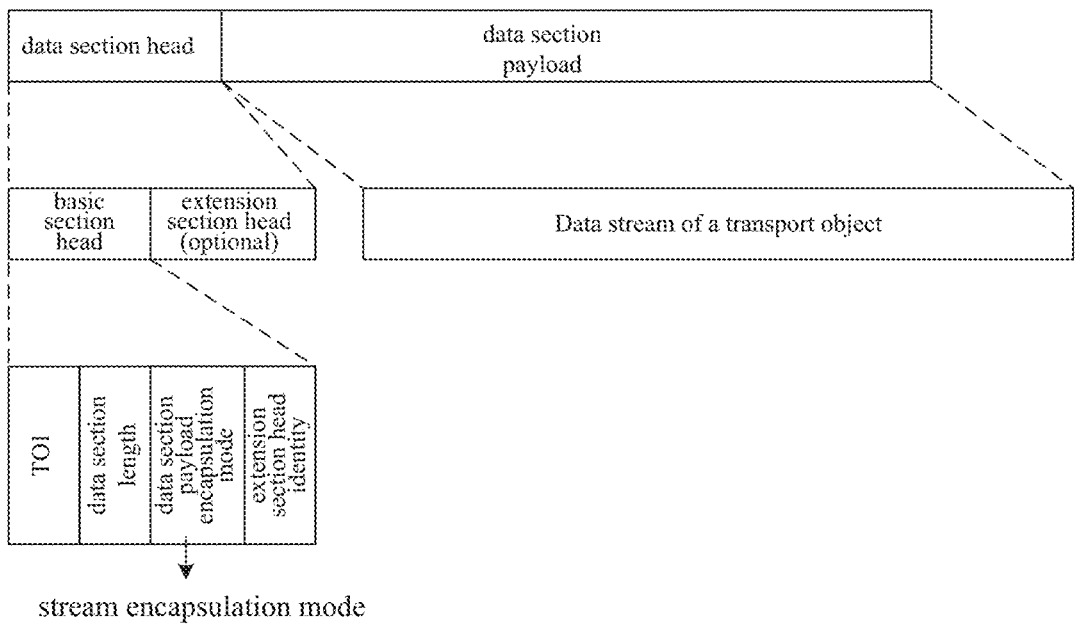
FIG. 6 is a chart showing a structure of a data section for PCM services according to an embodiment of the present disclosure.

In an embodiment, PCM services are used. PCM service is a kind of byte stream service without inner data structure and data of the transport object is PCM stream data. In case of the unstructured stream service, the data section payload encapsulation mode is the stream encapsulation mode. The data section payload includes direct stream bytes from the transport object. FIG. 6 is a chart showing a structure of a data section for PCM services according to an embodiment of the present disclosure.

The PCM stream may be recovered by concatenating the data section payloads in the data sections with the same TOI in a receiving sequence.

Figure 7:
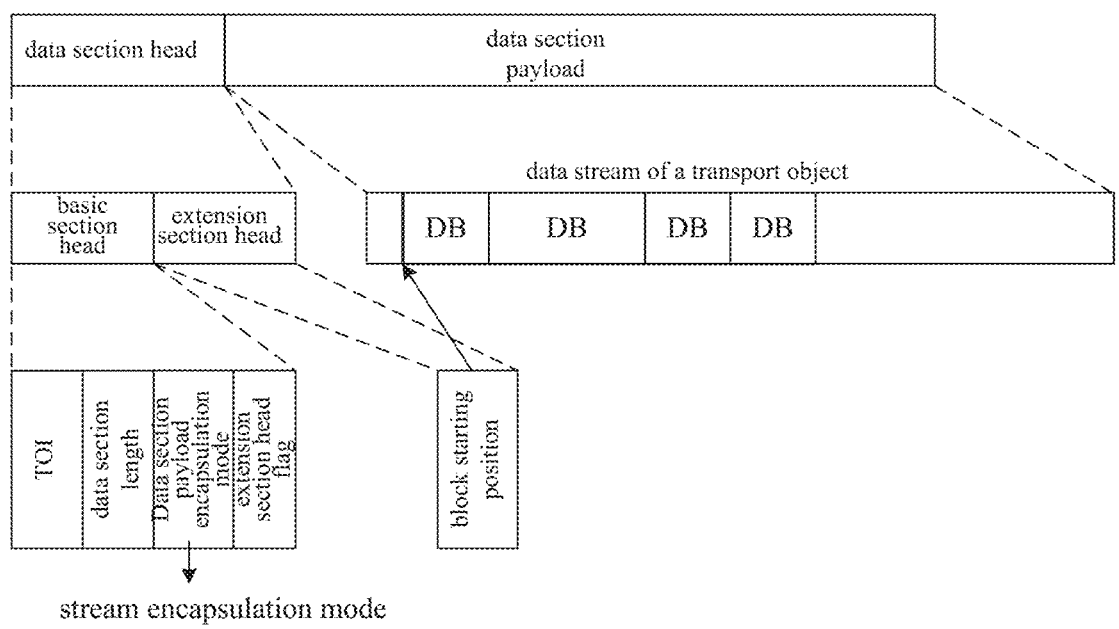
FIG. 7 is a chart showing a structure of a data section for structured stream services according to an embodiment of the present disclosure.

In an embodiment, MPEG-2 TS service and DVB-GSE service are used. MPEG-2 TS service and DVB-GSE service are stream service with inner data structure. MPEG-2 TS service uses a transport stream format and DVB-GSE service uses a general stream format. In case of the structured stream service, the data section payload encapsulation mode is the stream encapsulation mode. The data section payload includes direct stream bytes from the transport object. The structured stream from the transport object is the concatenation of the data blocks defined by the protocol type. The extension section head flag should indicate there is the extension section head. The extension section head includes the block starting position. FIG. 7 is a chart showing a structure of a data section for structured stream services according to an embodiment of the present disclosure.

In the embodiment, the protocol type indicates the protocol used by the transport object. The block starting position indicates the position where the data block starts in the data section. The data block is defined by the protocol type. The protocol type may be MPEG-2 TS or DVB-GSE. When the protocol type is MPEG-2 TS, the data block is a TS packet and the block starting position indicates the position where the TS packet starts in the data section. When the protocol type is DVB-GSE, the data block is a GSE packet and the block starting position indicates the position where the GSE packet starts in the data section.

According to the encapsulation mode, MPEG-2 TS service and DVB-GSE service may be transmitted together. They may be delivered to the transmission channel in the same format, which simplifies the transmission interface and QoS can be guaranteed by allocating the data sections.

According to the embodiments of the present disclosure, encapsulation modes may be selected for the variable-length packet service, the fixed-length packet service and the stream service and therefore these services can be multiplexed and transmitted efficiently in one data stream.

Figure 8:
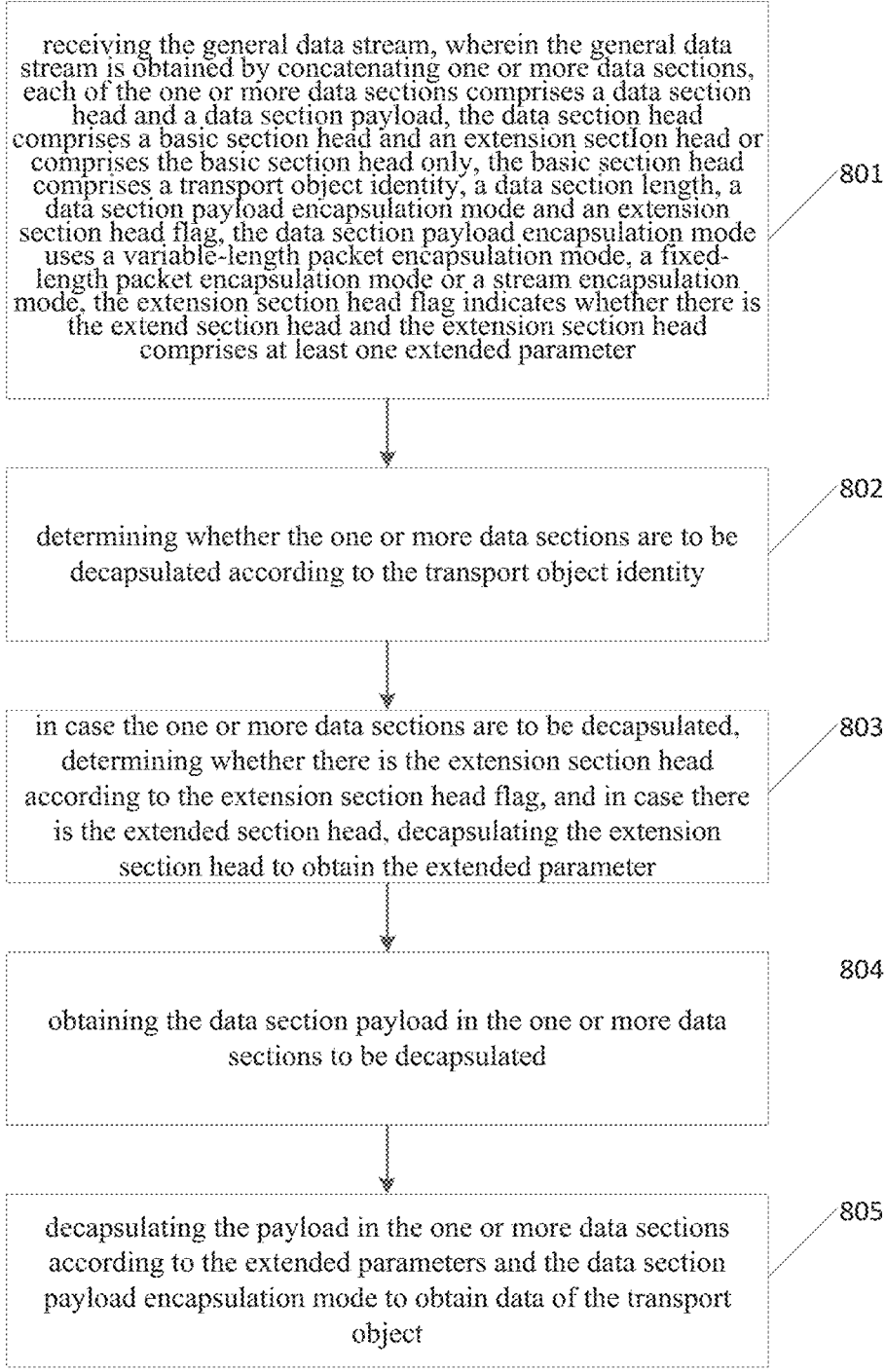
FIG. 8 is a flow chart showing a method for decapsulating a general data stream according to an embodiment of the present disclosure.

FIG. 8 is a flow chart showing a method for decapsulating a general data stream according to an embodiment of the present disclosure. As shown in FIG. 8, the method for decapsulating the general data stream includes the following steps.

In step 801, the general data stream is received. The general data stream is obtained by concatenating one or more data sections. Each of the one or more data sections includes a data section head and a data section payload. The data section head includes a basic section head and an extension section head or includes the basic section head only. The basic section head includes a transport object identity, a data section length, a data section payload encapsulation mode and an extension section head flag. The data section payload encapsulation mode uses a variable-length packet encapsulation mode, a fixed-length packet encapsulation mode or a stream encapsulation mode. The extension section head flag indicates whether there is the extension section head and the extension section head includes at least one extended parameter.

In an embodiment of the present disclosure, the one or more data sections may be obtained by encapsulating data from one transport object or from different transport objects.

Transport Object Identity (TOI) indicates the transport object transmitting the data in the data section payload. The transport object may be services and the transport object identity may be a service identity. The service may include IP services, Ethernet services, ATM services, PCM services, TS services, GSE services and etc. Among these services, IP services and Ethernet services belong to the variable-length packet service, ATM services belong to the fixed-length packet service, PCM services belong to the unstructured stream service and TS service and GSE service belong to the structured stream service.

In the embodiment, the extension section head is obtained by concatenating the extension section head length and at least one extended parameter field. The extended parameter field includes an extended parameter type, an extended parameter length and an extended parameter value. The extension section head length indicates data amount contained in the extension section head, the extended parameter type indicates name of the extended parameter for identifying different extended parameters, the extended parameter length indicates data amount contained in the extended parameter field and the extended parameter value indicates content of the extended parameter.

In step 802, whether the one or more data sections are to be decapsulated is determined according to the transport object identity.

In the embodiment, for a specific service, for example, for IP service, only the data section corresponding to the received IP service needs to be decapsulated and data sections corresponding to other services do not need to be decapsulated further. In this way, decapsulasion work can be reduced. However, for current MPEG2-TS or DVB-GSE streams, TS packets or GSE packets need to be decapsulated one by one.

In the embodiment, the starting position of the first data section head in the general data stream is usually indicated from the channel frame in the physical layer. For example, in China Mobile Multimedia Broadcasting (CMMB) system, a general data stream encapsulated several services may be transmitted on a multiplex frame consisted of several time slots. On the transmitting side, the multiplex frame head is aligned with the data section head and on the receiving side, after obtaining the first data section head, the starting position of the later data section head may be obtained according to the data section length.

In step 803, in case the data section is to be decapsulated, whether there is the extension section head is determined according to the extension section head flag. In case there is the extension section head, decapsulating the extension section head to obtain the extended parameters.

In the embodiment, the extension section head is obtained by concatenating the extension section head length and at least one extended parameter field. The extended parameter field includes an extended parameter type, an extended parameter length and an extended parameter value.

In the embodiment, the data section may be decapsulated in a sequential way or in a parallel way. When the sequential way is used and when the data section is not the one to be decapsulated, the next data section in the general data stream is obtained and steps in 802 and 803 are repeated. When the parallel way is used and when several data sections are obtained, steps 802 and 803 are performed for each data section in parallel; if some data section is not to be decapsulated, this data section is left undecapsulated.

In step 804, the data section payload in the one or more data sections to be decapsulated is obtained.

In step 805, the payload in the one or more data sections is decapsulated according to the extended parameter and the data section payload encapsulation mode to obtain data of the transport object.

In the embodiment, the data section payload encapsulation mode may use variable-length packet encapsulation mode, fixed-length packed encapsulation mode or stream encapsulation mode and services may select among these modes and therefore be multiplexed and transmitted in one general data stream in a high efficiency.

Figure 9:
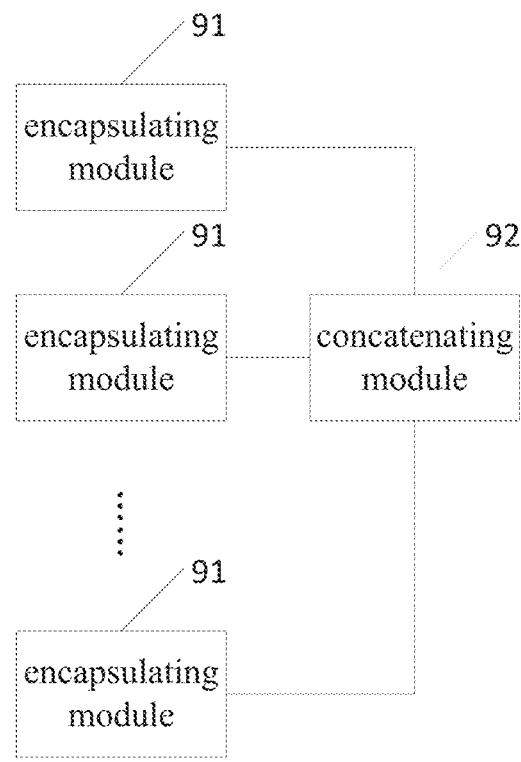
FIG. 9 is a block diagram showing a device for encapsulating a general data stream according to an embodiment of the present disclosure.

FIG. 9 is a block diagram showing a device for encapsulating a general data stream according to an embodiment of the present disclosure.

As shown in FIG. 9, the device for encapsulating the general data stream includes at least one encapsulating module 91 and a concatenating module 92. The encapsulating module 91 encapsulates data of a transport object based on a format of the general data stream to obtain one or more data sections. Each of the one or more data sections includes a data section head and a data section payload, the data section head includes a basic section head and an extension section head or includes the basic section head only, the basic section head includes a transport object identity, a data section length, a data section payload encapsulation mode and an extension section head flag. The data section payload encapsulation mode uses a variable-length packet encapsulation mode, a fixed-length packet encapsulation mode or a stream encapsulation mode, the extension section head flag indicates whether there is the extension section head and the extension section head includes at least one extended parameter.

The concatenating module concatenates the one or more data sections to obtain and transmit the general data stream. The one or more data section may come from the same transport object or from different transport objects.

According to the embodiments of the present disclosure, encapsulation modes may be selected fir the variable-length packet service, the fixed-length packet service and the stream service and therefore these services may be multiplexed and transmitted in one general data stream in a high efficiency.

Figure 10:
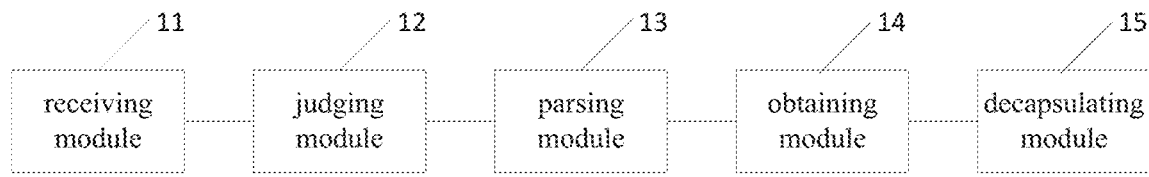
FIG. 10 is a block diagram showing a device for decapsulating a general data stream according to an embodiment of the present disclosure.

FIG. 10 is a block diagram showing a device for decapsulating a general data stream according to an embodiment of the present disclosure.

As shown in FIG. 10, the device for encapsulating the general data stream includes a receiving module 11, a judging module 12, a parsing module 13, an obtaining module 14 and a decapsulating module 15.

The receiving module is configured to receive the general data stream. The general data stream is obtained by concatenating one or more data sections. Each of the one or more data sections includes a data section head and a data section payload. The data section head includes a basic section head and an extension section head or includes the basic section head only. The basic section head includes a transport object identity, a data section length, a data section payload encapsulation mode and an extension section head flag. The data section payload encapsulation mode uses a variable-length packet encapsulation mode, a fixed-length packet encapsulation mode or a stream encapsulation mode. The extension section head flag indicates whether there is the extension section head and the extension section head includes at least one extended parameter.

The judging module 12 is configured to determine whether the data section is to be decapsulated according to the TOI. In case the data section is to be decapsulated, the judging module 12 is configured to determine whether there is the extension section head according to the extension section head identity.

In case there is the extension section head, the parsing module 13 is configured to decapsulate the extension section head to obtain the extended parameter.

The obtaining module 14 is configured to obtain the data section payload in the one or more data sections to be decapsulated according to the data section length.

The decapsulating module 15 is configured to decapsulate the payload in the one or more data sections according to the extended parameter and the data section payload encapsulation mode to obtain data of the transport object.

In the embodiment, the data section payload encapsulation mode may use variable-length packet encapsulation mode, fixed-length packed encapsulation mode and stream encapsulation mode and services may select among these modes and therefore be multiplexed and transmitted in a high efficiency.

Figure 11:
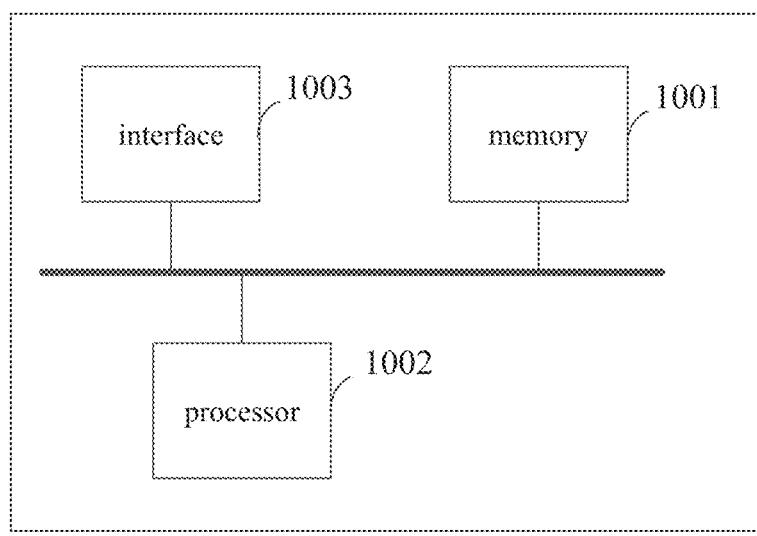
FIG. 11 is a block diagram showing another device for encapsulating or decapsulating a general data stream according to an embodiment of the present disclosure.

FIG. 11 is a block diagram showing another device for encapsulating or decapsulating a general data stream according to an embodiment of the present disclosure.

The device includes memory 1001, processor 1002 and programs stored in the memory 1001 and run on the processor 1002.

The processor 1002 performs the method for encapsulating or decapsulating the general data stream when running the program.

The device may further include an interface 1003 between the memory 1001 and the processor 1002.

Memory 1001 is configured to store programs to be run on the processor 1002.

Memory 1001 may include RAM or Non-volatile Memory, for example at least one disk.

If memory 1001, processor 1002 and interface 1003 are independently implemented, memory 1001, processor 1002 and interface 1003 may communicate with each other via a bus. The bus may be the Industry Standard Architecture (ISA) bus, the Peripheral Component Interconnection (PCI) bus, the Extended Industry Standard Architecture (EISA) bus. The bus may be the address bus, data bus, control bus. In FIG. 11, the bus is shown as a thick line but it does not limit the bus to one bus or one type of bus.

Memory 1001, processor 1002 and interface 1003 may integrate on the same chip and they may communicate with each other via interfaces.

Processor 1002 may be a Central Processing Unit (CPU) or an Application Specific Integrated Circuit (ASIC) or one or more integrated circuits implementing the embodiments of the present disclosure.

According to an embodiment of the present disclosure, a non-volatile computer readable storage medium is provided, which stores the program and when the program is executed, the encapsulating or decapsulating method is performed.

According to an embodiment of the present disclosure, a computer program product is provided, which when being executed, the encapsulating or decapsulating method is performed.

For the device embodiment, since it basically corresponds to the method embodiment, the part of the description of the method embodiment may be referred for related parts. The device embodiments described above are merely illustrative, in which, the units described as separate components may or may not be physically separated, and the units described as display components may or may not be physical units, that is, they may be located in one place, or distributed to multiple network units. Some or all of the modules may be selected according to actual needs to achieve the objectives of the solutions of the embodiments. A person skilled in the art can understand and implement it without creative work.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for encapsulating a general data stream, comprising:
    obtaining one or more data sections by encapsulating data of a transport object based on a format of the general data stream, wherein each of the one or more data sections comprises a data section head and a data section payload, the data section head comprises a basic section head and an extension section head or comprises the basic section head only, the basic section head comprises a transport object identity, a data section length, a data section payload encapsulation mode and an extension section head flag, the data section payload encapsulation mode uses a variable-length packet encapsulation mode, a fixed-length packet encapsulation mode or a stream encapsulation mode, the extension section head flag indicates whether there is the extension section head, the extension section head comprises at least one extended parameter; and
    concatenating the one or more data sections to obtain and transmit the general data stream.

2. The method according to claim 1, wherein;
    in case of the variable-length packet encapsulation mode, the data section payload comprises at least one data unit and the at least one data unit comprises a unit head and a unit payload, and the unit head comprises a segmentation flag, a unit length and a unit type;
    in case the segmentation flag indicates one complete data packet, the unit payload comprises a complete data packet; and
    in case the segmentation flag indicates a starting segment, a middle segment or an ending segment, the unit payload comprises partial data of a data packet and by combining unit payloads from the starting segment, the middle segments and the ending segment of the data packet, the data packet is obtained.

3. The method according to claim 2, wherein:
    the unit type comprises an object data unit or a padding unit, in case the unit type is the object data unit, the unit payload is a complete data packet or a partial data packet; and
    in case the unit type is the padding unit, the unit payload is a padding data consisted by random data or predetermined data.

4. The method according to claim 1, wherein:
    in case of the fixed-length packet encapsulation mode, the data section payload is obtained by concatenating one or more fixed-length data packets; and
    the extension section head flag indicates there is the extension section head and the extension section head comprises a packet length and a starting position of one data packet.

5. The method according to claim 1, wherein in case of the stream encapsulation mode, the data section payload is directly obtained from the data stream of the transport object.

6. The method according to claim 5, wherein:
    the data stream of the transport object is obtained by concatenating data blocks defined by a protocol type; and
    the extension section head flag indicates there is the extension section head and the extension section head comprises a starting position of a data block.

7. The method according to claim 6, wherein in case the protocol type is MPEG-2 Transport Stream (TS), the starting position of a data block is the starting position of one TS packet in the data section payload.

8. A method for decapsulating a general data stream, comprising:
    receiving the general data stream, wherein the general data stream is obtained by concatenating one or more data sections, each of the one or more data sections comprises a data section head and a data section payload, the data section head comprises a basic section head and an extension section head or comprises the basic section head only, the basic section head comprises a transport object identity, a data section length, a data section payload encapsulation mode and an extension section head flag, the data section payload encapsulation mode uses a variable-length packet encapsulation mode, a fixed-length packet encapsulation mode or a stream encapsulation mode, the extension section head flag indicates whether there is the extension section head, the extension section head comprises at least one extended parameter;

determining whether the one or more data sections are to be decapsulated according to the transport object identity;

in case the one or more data sections are to be decapsulated, determining whether there is the extension section head according to the extension section head flag;

in case there is the extension section head, decapsulating the extension section head to obtain the at least one extended parameter;

obtaining the data section payload in the one or more data sections to be decapsulated; and decapsulating the payload in the one or more data sections according to the at least one extended parameter and the data section payload encapsulation mode to obtain data of the transport object.

9. The method according to claim 8, wherein:
in case of the variable-length packet encapsulation mode, the data section payload comprises at least one data unit and the at least one data unit comprises a unit head and a unit payload, and the unit head comprises a segmentation flag, a unit length and a unit type;
in case the segmentation flag indicates one complete data packet, the unit payload comprises a complete data packet; and in case the segmentation flag indicates a starting segment, a middle segment or an ending segment, the unit payload comprises partial data of a data packet and by combining unit payloads from the starting segment, the middle segments and the ending segment of the data packet, the data packet is obtained.

10. The method according to claim 9, wherein:
the unit type comprises an object data unit or a padding unit,
in case the unit type is the object data unit, the unit payload is a complete data packet or a partial data packet; and
in case the unit type is the padding unit, the unit payload is a padding data consisted by random data or predetermined data.

11. The method according to claim 8, wherein:
in case of the fixed-length packet encapsulation mode, the data section payload is obtained by concatenating one or more fixed-length data packets; and
the extension section head flag indicates there is the extension section head and the extension section head comprises a packet length and a starting position of one data packets.

12. The method according to claim 8, wherein in case of the stream encapsulation mode, the data section payload is directly obtained from the data stream of the transport object.

13. The method according to claim 12, wherein:
the data stream of the transport object is obtained by concatenating data blocks defined by a protocol type; and the extension section head flag indicates there is the extension section head and the extension section head comprises a starting position of a data block.

14. The method according to claim 13, wherein in case the protocol type is MPEG-2 Transport Stream (TS), the starting position of a data block is the starting position of one TS packet in the data section payload.

15. A device for encapsulating or decapsulating a general data stream, comprising:
a processor; and a memory configured to store instructions executable by the processor, wherein, the processor is configured to:
obtain one or more data sections by encapsulating data of a transport object based on a format of the general data stream, wherein each of the one or more data sections comprises a data section head and a data section payload, the data section head comprises a basic section head and an extension section head or comprises the basic section head only, the basic section head comprises a transport object identity, a data section length, a data section payload encapsulation mode and an extension section head flag, the data section payload encapsulation mode uses a variable-length packet encapsulation mode, a fixed-length packet encapsulation mode or a stream encapsulation mode, the extension section head flag indicates whether there is the extension section head and the extension section head comprises at least one extended parameter; and
concatenate one or more data sections to obtain and transmit the general data stream; or
the processor is configured to: receive the general data stream, wherein the general data stream is obtained by concatenating the one or more data sections, each of the one or more data sections comprises a data section head and a data section payload, the data section head comprises a basic section head and an extension section head or comprises the basic section head only, the basic section head comprises a transport object identity, a data section length, an data section payload encapsulation mode and an extension section head flag, the data section payload encapsulation mode uses a variable-length packet encapsulation mode, a fixed-length packet encapsulation mode or a stream encapsulation mode, the extension section head flag indicates whether there is the extension section head and the extension section head comprises at least one extended parameter;
determine whether the one or more data sections are to be decapsulated according to the transport object identity;
in case the one or more data sections are to be decapsulated, determine whether there is the extension section head according to the extension section head flag;
in case there is the extension section head, decapsulate the extension section head to obtain the at least one extended parameter;
obtain the data section payload in the one or more data sections to be decapsulated; and
decapsulate the payload in the one or more data sections according to the at least one extended parameter and the data section payload encapsulation mode to obtain data of the transport object.

16. The device according to claim 15, wherein;
in case of the variable-length packet encapsulation mode, the data section payload comprises at least one data unit and the at least one data unit comprises a unit head and a unit payload, and the unit head comprises a segmentation flag, a unit length and a unit type; in case the segmentation flag indicates one complete data packet, the unit payload comprises a complete data packet; and in case the segmentation flag indicates a starting segment, a middle segment or an ending segment, the unit payload comprises partial data of a data packet and by combining unit payloads from the starting segment, the middle segments and the ending segment of the data packet, the data packet is obtained.

17. The device according to claim 16, wherein:

the unit type comprises an object data unit or a padding unit, in case the unit type is the object data unit, the unit payload is a complete data packet or a partial data packet; and in case the unit type is the padding unit, the unit payload is a padding data consisted by random data or predetermined data.

18. The device according to claim 15, wherein:

in case of the fixed-length packet encapsulation mode, the data section payload is obtained by concatenating one or more fixed-length data packets; and the extension section head flag indicates there is the extension section head and the extension section head comprises a packet length and a starting position of one data packet.

19. The device according to claim 15, wherein in case of the stream encapsulation mode, the data section payload is directly obtained from the data stream of the transport object.

20. The device according to claim 19, wherein the data stream of the transport object is obtained by concatenating data blocks defined by a protocol type; and the extension section head flag indicates there is the extension section head and the extension section head comprises a starting position of a data block.

* * * * *